United States Patent [19]
Tauchi

[11] Patent Number: 5,927,929
[45] Date of Patent: Jul. 27, 1999

[54] METHOD AND APPARATUS FOR FEEDING FILM-LOADED CARTRIDGES

[75] Inventor: Yasuhito Tauchi, Wakayama, Japan

[73] Assignee: Noritsu Koki Co., Ltd., Wakayama, Japan

[21] Appl. No.: 08/801,021

[22] Filed: Feb. 19, 1997

[30] Foreign Application Priority Data

Feb. 21, 1996 [JP] Japan ................................ 8-033401

[51] Int. Cl.⁶ .................................................. B65G 65/40
[52] U.S. Cl. ...................... 414/417; 414/412; 414/798.1; 414/413; 414/417; 29/806
[58] Field of Search ................... 414/413, 797.4, 414/411, 412, 798, 798.1, 417, 810, 811, 800, 806; 29/806

[56] References Cited

U.S. PATENT DOCUMENTS

| | | | |
|---|---|---|---|
| 2,323,852 | 7/1943 | Seidel et al. | 414/411 |
| 3,308,977 | 3/1967 | Cochran et al. | 414/417 X |
| 3,921,278 | 11/1975 | Basu | 29/806 X |
| 4,466,767 | 8/1984 | Meschi | 414/411 |
| 4,621,970 | 11/1986 | Wurfel et al. | 414/417 X |
| 5,409,368 | 4/1995 | Heiskell et al. | 414/417 X |

FOREIGN PATENT DOCUMENTS

| | | |
|---|---|---|
| 0 421 493 | 4/1991 | European Pat. Off. . |
| 0 676 664 | 10/1995 | European Pat. Off. . |
| 35 46 199 | 7/1986 | Germany . |

*Primary Examiner*—Frank E. Werner
*Attorney, Agent, or Firm*—Wenderoth, Lind & Ponack, L.L.P.

[57] ABSTRACT

A film feed apparatus in which cartridge panels capable of carrying a plurality of films in cartridges are used to store films and feed them continuously into a photoprinter. The film feed apparatus includes a cartridge storage unit, a panel mover, a cartridge separator, a cartridge conveyor, a panel storage unit. Cartridge panels are sent to a specific cartridge separating station, where separating arms are inserted in openings formed in each panel to separate cartridges from the panel and drop them through an opening. The cartridges separated from the panel are sent on a conveyor belt onto another conveyor belt and fed in a single file. The empty panels are stacked in the panel storage unit by a panel stacker.

20 Claims, 13 Drawing Sheets

METHOD AND APPARATUS FOR FEEDING FILM-LOADED CARTRIDGES

BACKGROUND OF THE INVENTION

This invention relates to a method and apparatus for continuously feeding cartridged developed films into a photoprinter.

A new type of film which can be developed and printed without taking it out of a cartridge is becoming an industry standard. This film is automatically separable at its inner end from the cartridge by inserting a tool. The film is developed while pulling it out of the cartridge and printed while pulling it into the cartridge. Thus, when the film has been printed, it is neatly housed in the cartridge.

Various film developing devices and photoprinters for developing and printing such new type of films have been proposed. For example, a film developing device which can continuously carry out developing, fixing, drying and other steps is proposed in Japanese Patent Application 6-75661.

This developing device has cartridge cases for storing cartridges. In Japanese Patent Application 7-240123, a new type of cartridge case (hereinafter referred to as cartridge panels) are is mounted on a film developing device so that cartridges can be more efficiently taken out and reset.

As one way to automate a photoprinter, Unexamined Japanese Patent Publication 7-36120 discloses a device in which a plurality of cartridges are set on a turntable to improve printing efficiency. Also proposed are a device for feeding cartridges into this printer (Unexamined Japanese Patent Publication 7-325350, and a cartridge storage device for continuously feeding cartridges into this cartridge feed device (Unexamined Japanese Patent Publication 6-309065).

These former developing machines and photoprinters can automate the individual photographic processes. Thus, if the cartridge panels proposed in the second publication are used in the developing device proposed in the first publication and film-loaded cartridges are set in the cartridge panels, it will be possible to automatically develop films.

But for printing, these cartridges have to be manually removed from the panels and fed into, for example the photoprinter proposed in the third publication. The cartridge feed device proposed in the fourth publication and the cartridge storage device proposed in the fifth publication will offer no solution to this problem, either. That is, even if these devices are mounted on a photoprinter, cartridges will have to be removed manually from the cartridge panels and set manually in the cartridge storage device.

It is extremely troublesome to manually feed cartridges one by one into a photoprinter.

An object of this invention is to provide a method and apparatus for automatically feeding film-loaded cartridges into a photoprinter.

SUMMARY OF THE INVENTION

According to this invention, there is provided a method of feeding film-loaded cartridges comprising fitting a plurality of film-loaded cartridges in a cartridge panel capable of carrying a plurality of film-loaded cartridges, and moving the panel to a cartridge separating station. The cartridges are then seperated from the from the panel by inserting a cartridge separating arm into the panel, and sent in a predetermined direction on a first conveyor means. The separated cartridges are then arranged in an orderly manner and fed one by one on a second conveyor means that intersects the first conveyor means.

Each of the cartridges may be loaded with a film developed in a developing step.

There is provided an apparatus for carrying out either of the above methods. The apparatus comprises a cartridge storage means capable of storing a plurality of cartridge panels each capable of carrying a plurality of film-loaded cartridges, and panel holder plates for holding the plurality of cartridge panels. A panel holding and moving means is provided which is movable to a cartridge separating station and capable of holding all but the lowermost panel when the lowermost panel is separated from the other panels at the cartridge separating station by opening the panel holder plates. The apparatus also includes a cartridge separating means for separating the cartridges from the panels by inserting a cartridge separating arm into an opening of one of the cartridge arms at the cartridge separating station and for moving each panel in a predetermined direction, and a cartridge conveyor means for feeding the cartridges separated from the panels in a predetermined direction and then arranging and feeding the separated cartridges one by one in a direction that crosses the predetermined direction.

In the first invention, in order to automatically and continuously feed film-loaded cartridges into a photoprinter, a plurality of film-loaded cartridges are set in a cartridge panel. This method is versatile Actually, as in the second invention, a developed film is loaded in each cartridge. That is, cartridges set in the panel before the developing step are fed into the photoprinter as it is. Thus in the photoprinter, the panel is simply set in the cartridge storage unit. The entire process can thus be carried out more efficiently.

The film feed apparatus of the third invention can be used for carrying out either of the above methods.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
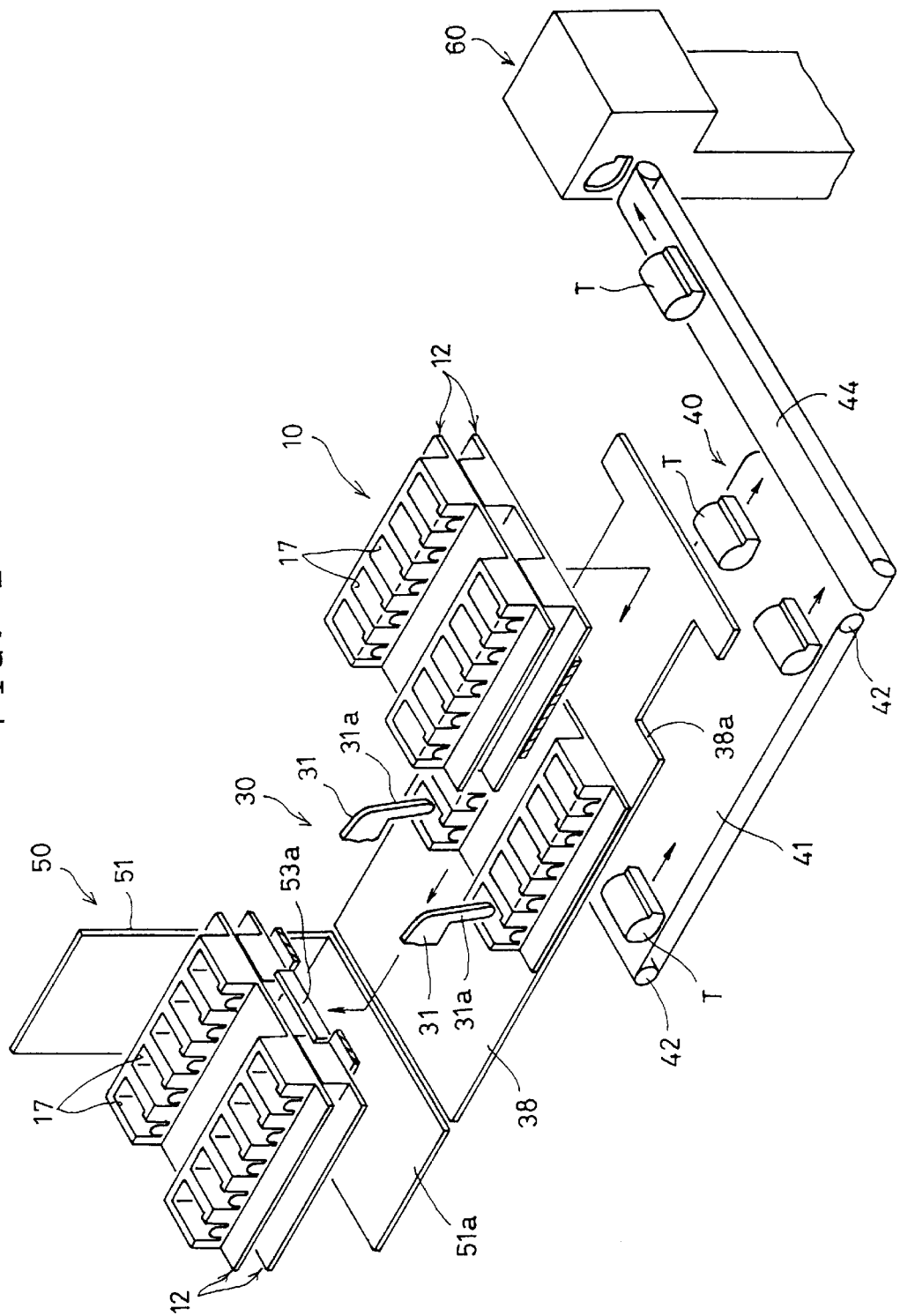
FIG. 1 is an entire schematic perspective view of an apparatus for feeding film-loaded cartridges of a first embodiment.

Now referring to the drawings, embodiments of this invention are described.

Figure 2:
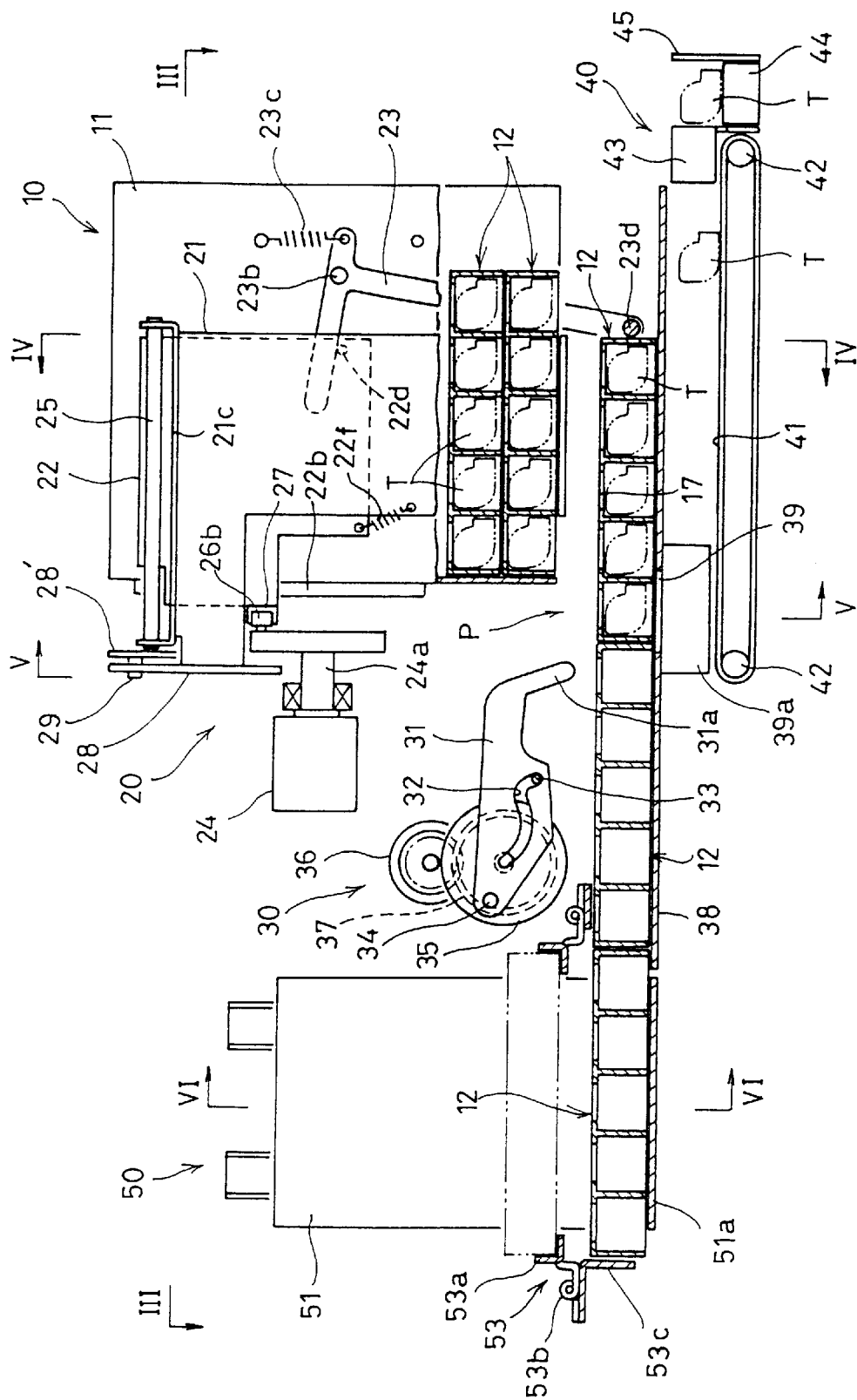
FIG. 2 is a partial schematic side view of FIG. 1.

FIGS. 1 and 2 are a schematic perspective view and a side view of a cartridged film feed device used to carry out the film feed method according to this invention. The film feed device of this embodiment is used to feed cartridged films to a photoprinter for printing film. But the photoprinter itself is not the point of the present invention and thus is neither shown nor described.

As shown, the cartridged film feed device comprises a cartridge storage unit 10, a panel mover 20, a cartridge separator 30, a cartridge conveyor 40, a panel storage unit 50, and a cartridge feeder 60. The cartridge feeder is the same type as proposed in Japanese Patent Application 6-309065. In order to enhance understanding of the invention, FIG. 1 mainly shows the movement of cartridge panels (to be described below) and cartridges.

Figure 12:
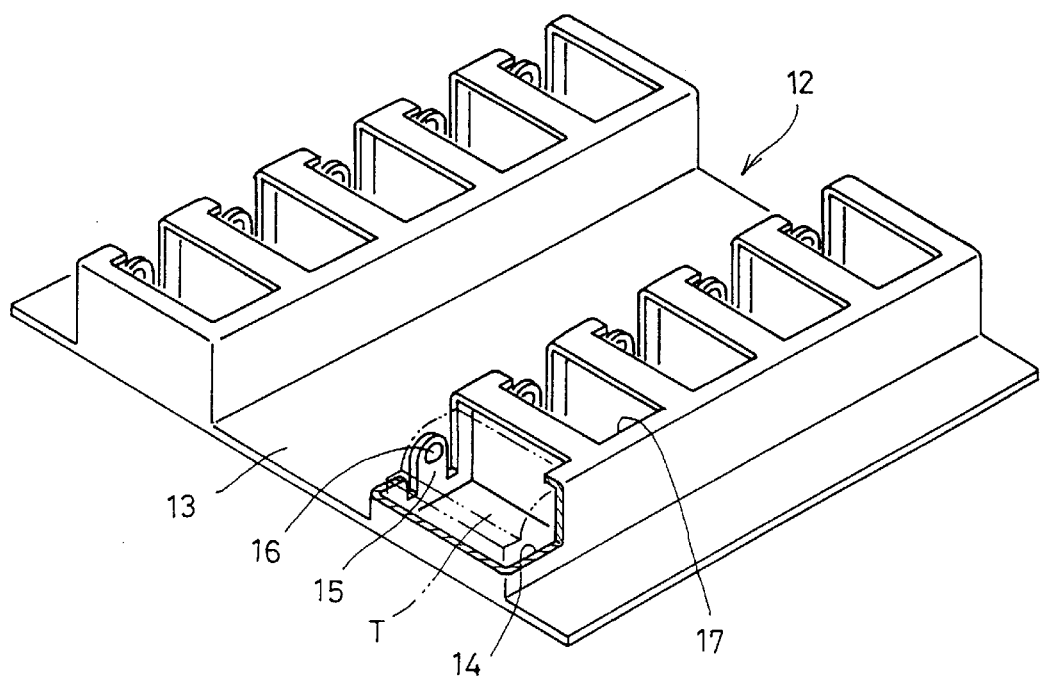
FIG. 12 is a schematic perspective view of a cartridge panel.

The cartridge storage unit 10 includes a box 11 having a U-section with its top, bottom and one side open. In the box 11, a plurality of cartridge panels 12 can be stacked. Now referring to FIG. 12, each cartridge panel 12 has a panel plate 13 formed with a plurality of (two in the illustrated example) rows of cartridge pockets 14 (5 pockets in each row in the illustrated example), each pocket being capable of accepting one cartridge T. These cartridge panels 12 are disclosed in Japanese Patent Application 7-240123. Here, their description is limited to a necessary minimum.

While not shown, each cartridge panel 12 is shaped so that a cartridge T can be fitted in each cartridge pocket 14 from the back of the panel 12. A cartridge T is received in each pocket 14 while being sandwiched between a resilient member 15 and a side wall on the opposite side with a protrusion 16 of the resilient member 15 received in a hole formed in the spool shaft. Each pocket 14 has a top opening 17 through which a bar code (ID code) on the surface of the cartridge can be read.

Figure 4:
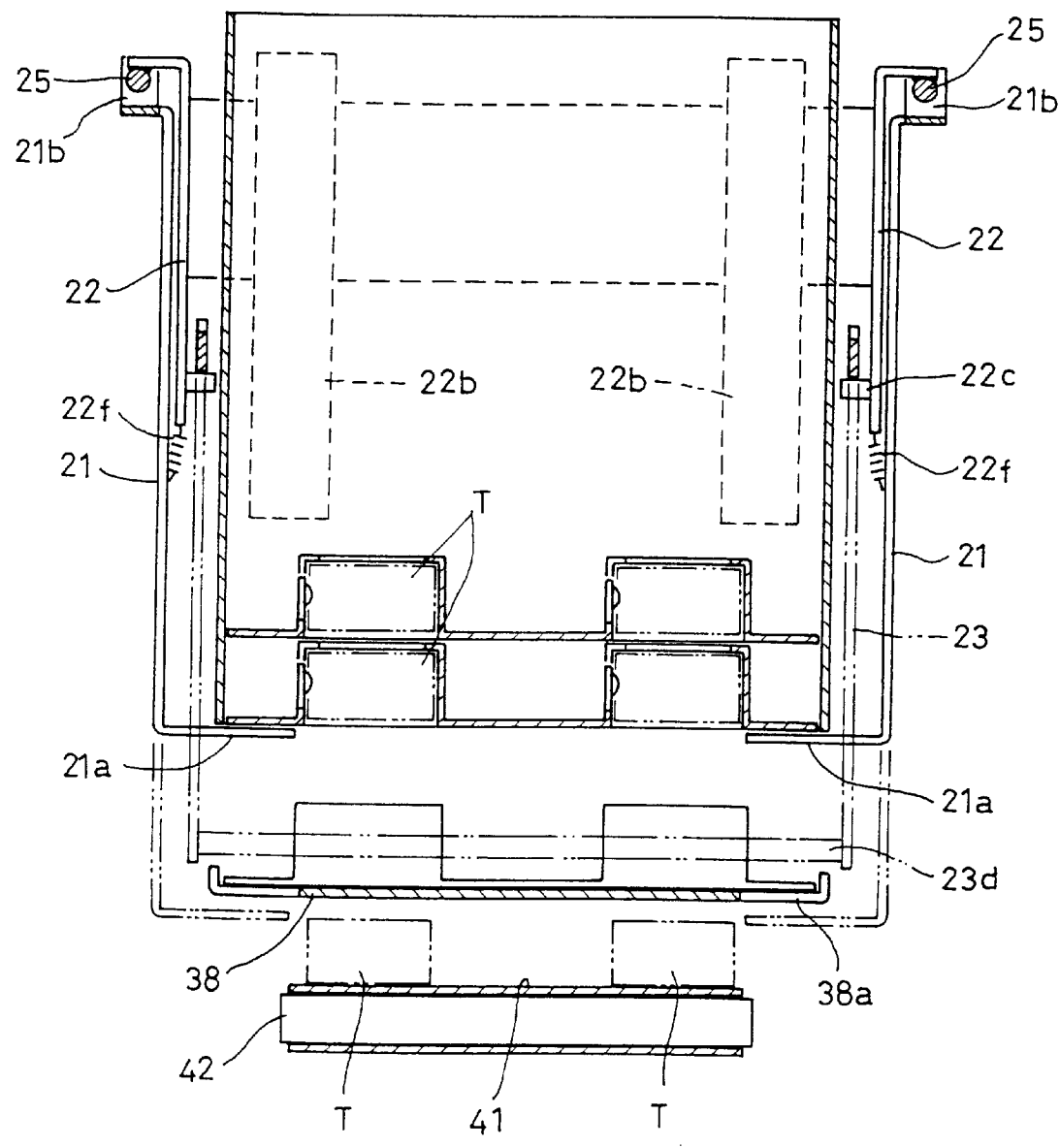
FIG. 4 is a sectional view taken along line IV—IV of FIG. 2.
Figure 5:
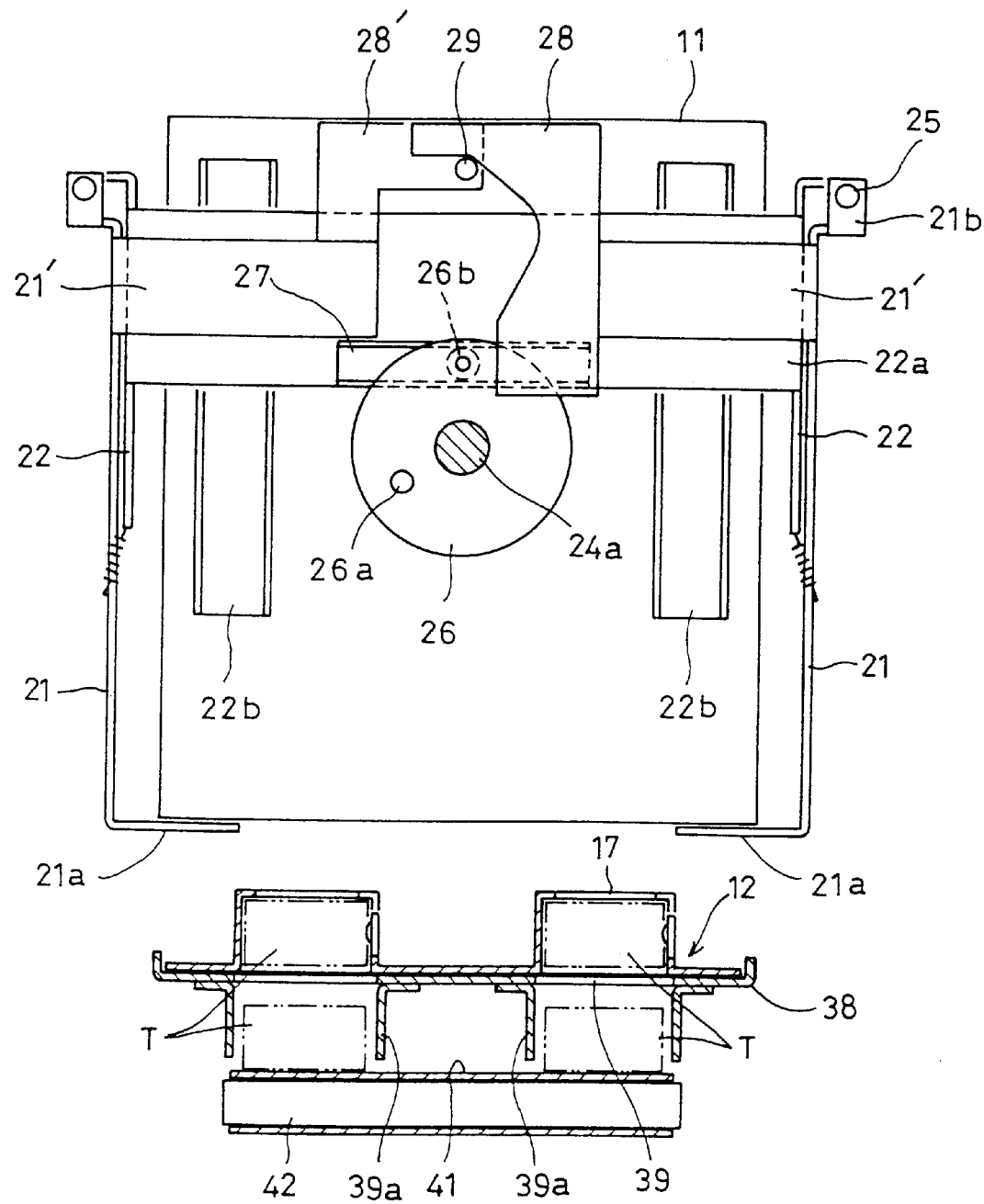
FIG. 5 is a side view taken along line V—V of FIG. 2.

The panel mover 20 has push arms 23 pivoted by a drive source such as a motor 24 through panel holder plates 21 and coupling plates 22 provided inside and juxtaposed with the panel holder plates 21, as shown in FIGS. 2, 4 and 5. The panel holder has a pair of panel holder plates 21 having inwardly bent bottom flanges 21a for gripping and holding a plurality of stacked panels.

A panel holder plate support portion includes a rod 25 is rotatably supported between lobes 21b provided on the top of each panel holder plate 21, and a coupling plate 22 which has a top edge secured to the rod 25. Thus, panel holder plates 21 can swing outwardly by pivoting about the respective rods 25.

As shown in FIG. 5, the panel holder plates 21 have arms 21' extending inwardly toward each other. One of the arms 21' has a cam plate 28 at its inner end, while the other arm 21' has a power transmission plate 28' at its inner end. A synchronizing pin 29 is provided between the plates 28 and 28'. The coupling plates 22 are coupled together by a second coupling plate 22' which has a horizontal guide 27 near its center.

The motor 24 has a motor shaft 24a which carries at its free end a rotary disk 26 having a cam pin 26a on its side facing the motor and a small roller 26b on the other side. The small roller 26b fits in a groove formed in the horizontal guide 27. Thus, when the motor rotates, the small roller 26b is moved up and down while sliding horizontally in the groove in the guide 27. As will be described later, the cam pin 26a moves along the mountain-shaped cam surface of the cam plate 28 to pivot the panel holder plates 21 through the arms 21'.

Figure 3:
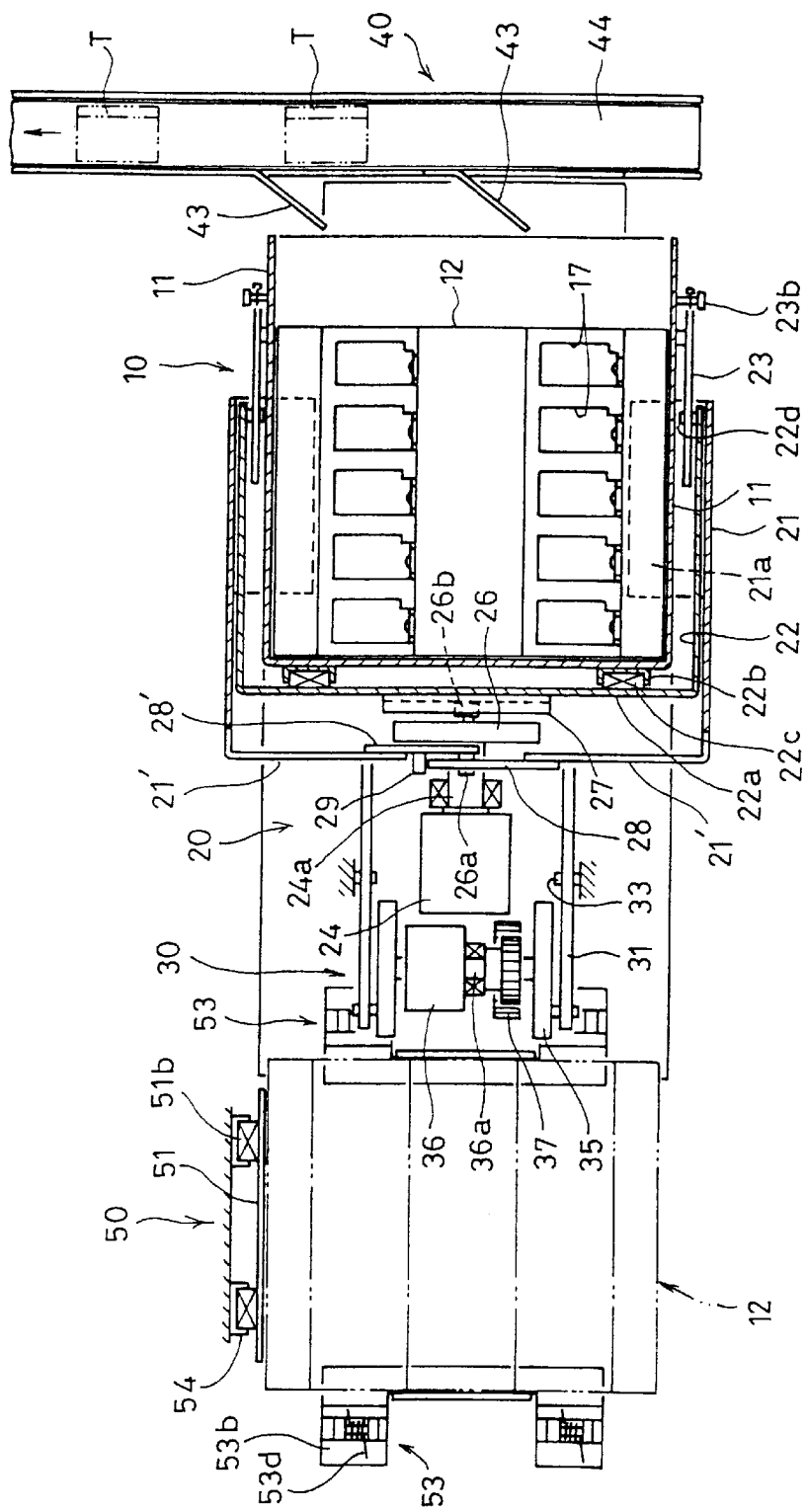
FIG. 3 is a plan view taken along line III—III of FIG. 2.

As the rotary disk 26 rotates, the small roller 26b and thus the coupling plates 22a and 22 are moved up and down. To ensure smooth vertical movement of the coupling plates, as shown in FIG. 3, the coupling plate 22a carries on its inner side rollers 22c that fit in and roll along vertical guides 22b mounted on the side wall of the box 11. The push arms 23 pivot urged by pins 22d. Each panel holder plate 21 is coupled to the respective coupling plate by a spring 22f.

While not shown, the motor 24 is fixedly mounted on the panel storage box 11 by a support member which is also fixed to the box 11. The box 11 is in turn fixedly mounted on the side wall of the photoprinter by an unillustrated mounting means.

Referring to FIGS. 2–4, the push arms 23 are L-shaped members provided on both sides of the box 11 so as to be pivotable about hinges 23b. Springs 23c bias the arms 23 counterclockwise in FIG. 2. A coupling rod 23d connects the bottom ends of the straight portions 23a of the arms 23. As the arms are pivoted clockwise in FIG. 2, the coupling rod 23d pushes cartridge panels 12 to a cartridge separating station.

As shown in FIGS. 2 and 3, the cartridge separator 30 comprises separating arms 31, fixing pins 33 engaging in guide grooves 32 formed in the respective arms 31, rotary disks 35 having pins 34 connected to one end of the respective arms 31, and a drive source such as a motor 36 for rotating the disks 35. Numerals 36a and 37 indicate a motor output shaft and a reduction gear, respectively. As shown, the arms 31 are hooked at the free ends 31a. The cartridge separator 30 has as many arms 31 as rows of cartridge panels 12 (two in the illustrated example).

The fixing pins are fixedly mounted to one side of mounting arms extending from the box 11 in an unillustrated manner. The motor 36 is also mounted in the same way. The guide grooves 32 have a wavy shape for the purpose to be described below.

Cartridge panels 12 are unloaded by the panel mover 20 one by one from the box 11, deposited on a horizontal guide table 38 and sent to the cartridge separating station P, where cartridges T in the respective rows are simultaneously separated from each panel by the separating arms 31 and dropped. As shown in FIG. 1, the horizontal guide table 38 has cutouts 38a so that the panel holder plates 21 can move vertically without interfering with the table 38.

At the cartridge separating station, the horizontal guide table 38 has openings 39 through which cartridges separated from panels 12 drop. Guides 39a guide cartridges to drop them onto a conveyor belt 41 of the conveyor 40 while keeping them in proper position. The conveyor belt 41 extends between rollers or pulleys 42. A vertical guide plate 43 is provided at the delivery end of the conveyor belt 41. Also at the delivery end of the conveyor belt 41, a second conveyor belt 44 is provided to extend in the direction perpendicular to the first conveyor belt 41. Cartridges on the first conveyor belt 41 are moved onto the second conveyor belt 44, where they are arranged in a single file. 45 is a side plate.

Figure 6:
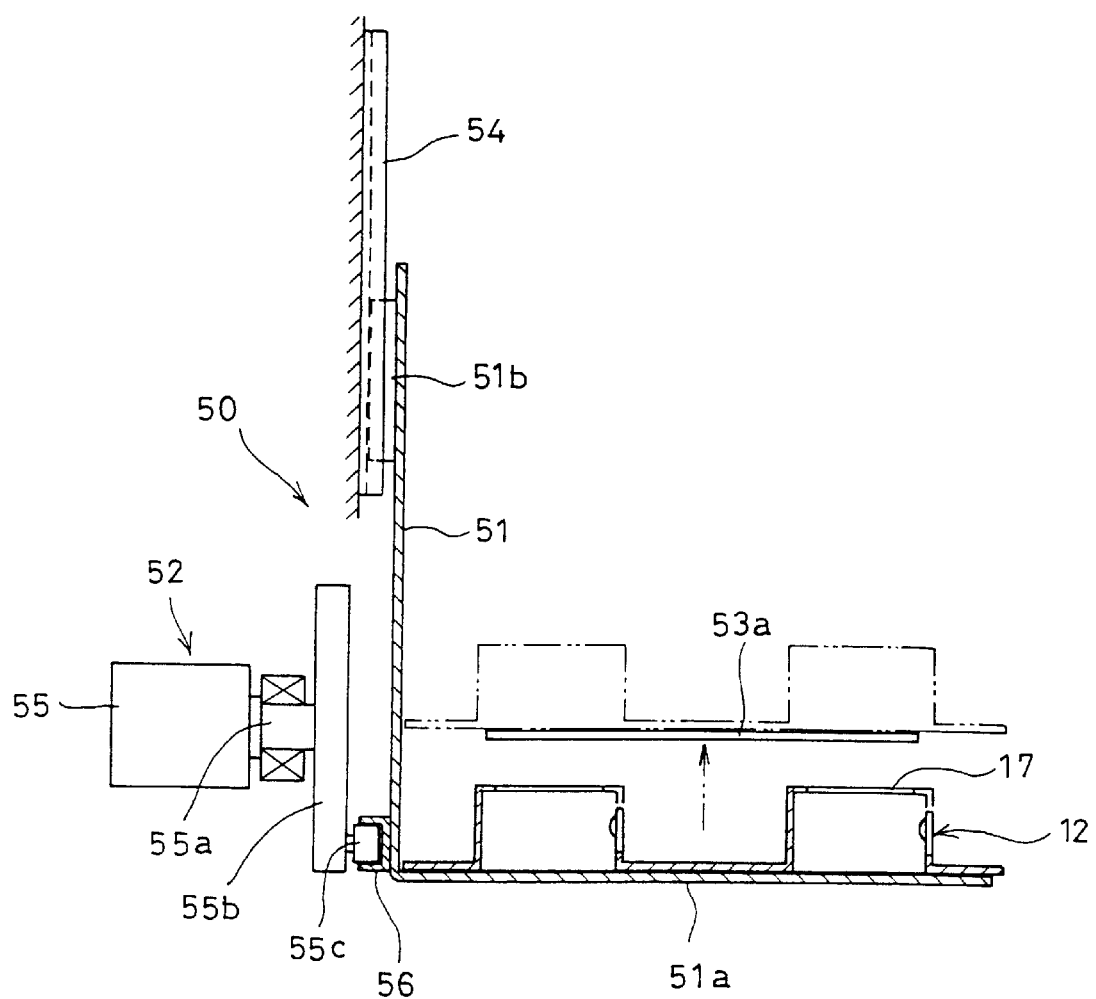
FIG. 6 is a partial sectional view taken along line VI—VI of FIG. 2.

Referring to FIG. 6, the panel storage unit 50 comprises an L-shaped panel stacker 51, a driving means 52 for moving the panel stacker 51 up and down, and panel holders 53 shown in FIG. 2. The panel stacker 51 has a block 51b provided on the outside of its vertical portion and is moved vertically with the block 51b slidaly received in a guide 54 provided on the side wall of the photoprinter.

The driving means 52 has a motor 55 having an output shaft 55a carrying a rotary disk 55b at its free end. The rotary disk 55b has a small roller 55c provided near its circumference and fitting in a guide 56 provided on the panel stacker 51 at its lower corner. Thus, by rotating the disk 55b, the panel stacker 51 is moved up and down.

As shown in FIGS. 2 and 3, each panel holder 53 comprises an L-shaped panel holding member 53a, hinge members 53b provided at both ends of the holding member 53a, and base members 53c supporting the hinge members 53b. Each hinge member 53b has a spring 53d for upwardly biasing the panel holding member 53a.

The panel holder 53 near the cartridge separator 30 has its base members 53c fixed to a member (not shown) to which is also fixedly mounted the cartridge separator 30 so that the cartridge panels 12 can pass under the base members 53c.

The operation of this embodiment is now described.

Figure 7:
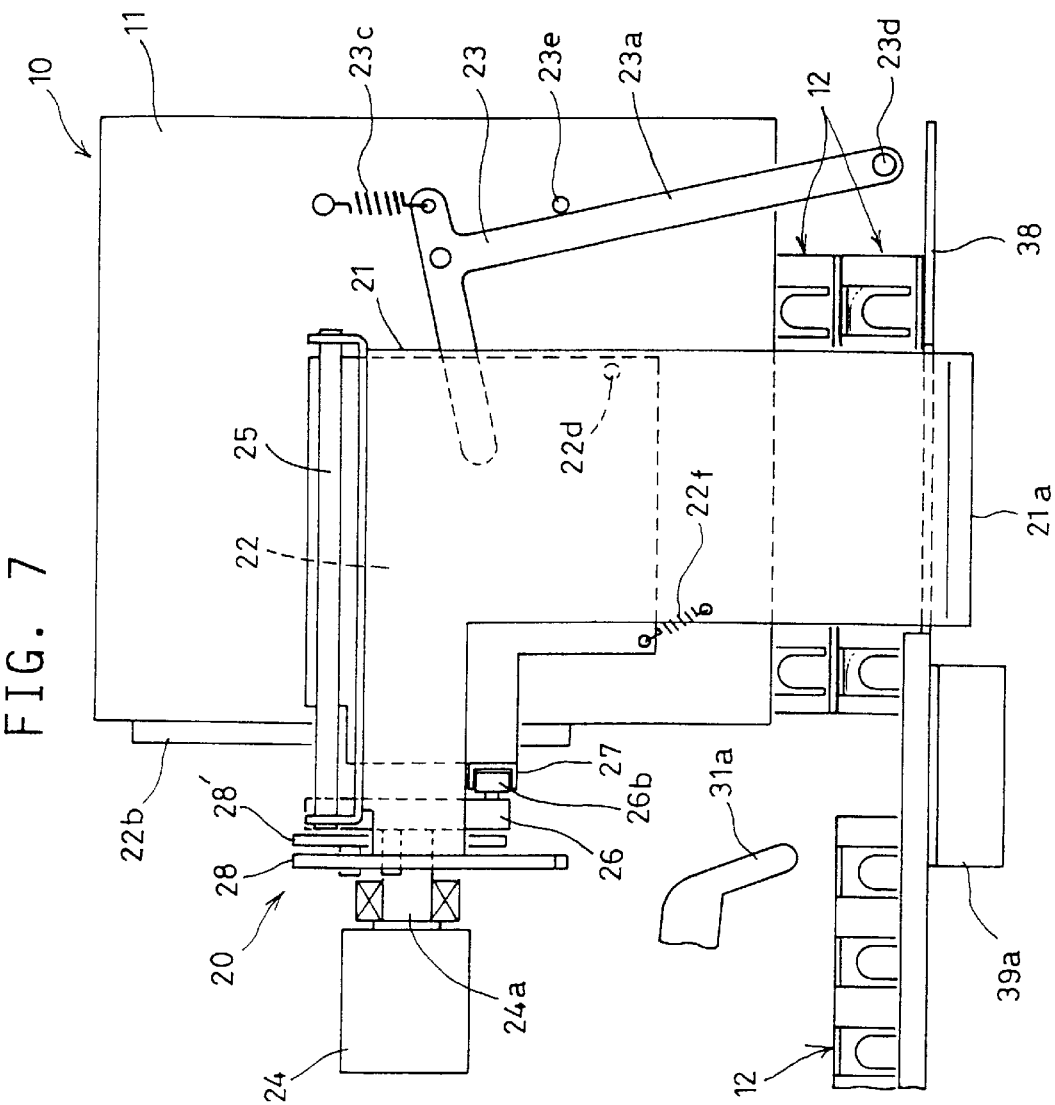
FIG. 7 is a first view illustrating the operation of a panel mover.
Figure 8:
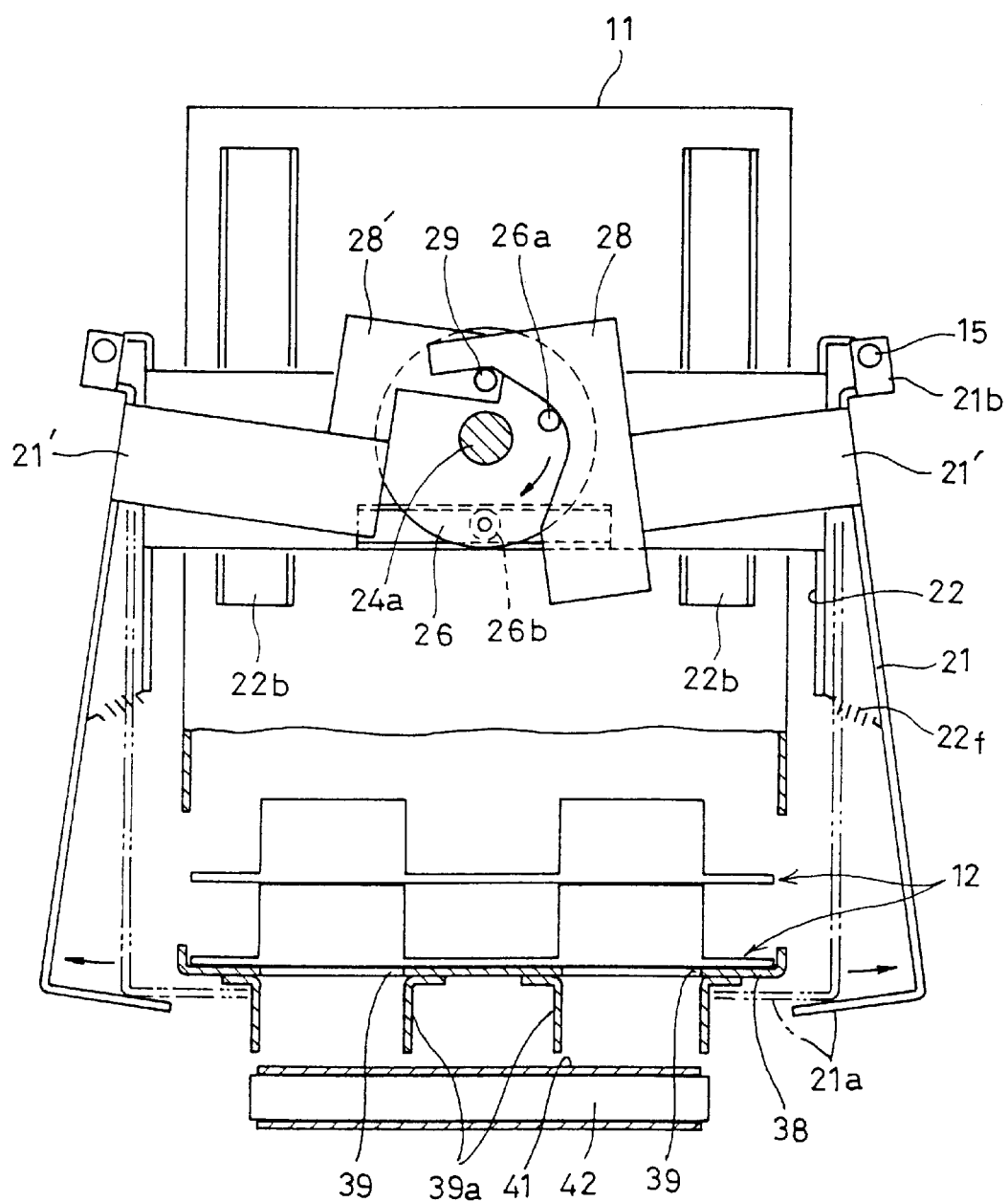
FIG. 8 is a second view illustrating the operation of the panel mover.

FIG. 5 shows the positional relationship between the box 11 and the panel holder plates 21 when the cartridge panels 12 are loaded into the box 11. In this state, the small rollers 26b of the rotary disk 26 are at the highest level, with the cam pin 26a not in contact with the cam plate 28. When the rotary disk 26 rotates, the panel holder plates 21 carrying a plurality of panels 12, lowers together with the coupling plates 22 (to the lowest level shown by chain lines in FIG. 8). By the time the plates 21 reach the lowest level, the cam pin 26a moves along the mountain-shaped cam surface of the cam plate 28 to somewhere near the peak of the mountain. This causes the panel holder plates 21 to pivot outwardly about the rods 25 as shown by solid lines in FIG. 8. FIG. 7 is a side view in this state.

In this state, each push arm 23 is pulled up by the spring 23c into abutment with the pin 23e, as shown in FIG. 7. When the rotary disk 26 rotates further from this state, the panel holder plates 21 and the coupling plates 22 begin rising together. Simultaneously the cam pin 26a moves past the peak of the mountain and toward the root of the mountain, allowing the panel holder plates 21 to pivot inwardly. Thus, by the time the pin 26a separates from the cam plate, the panel holder plates 21 regain their vertical posture as shown by solid line in FIG. 9. As the panel holder plates 21 pivot inward, their bottom flanges 21a are inserted between the lowest and the second lowest panels. Thus, all but the lowest panel are raised by the panel holder plates 21.

Figure 9:
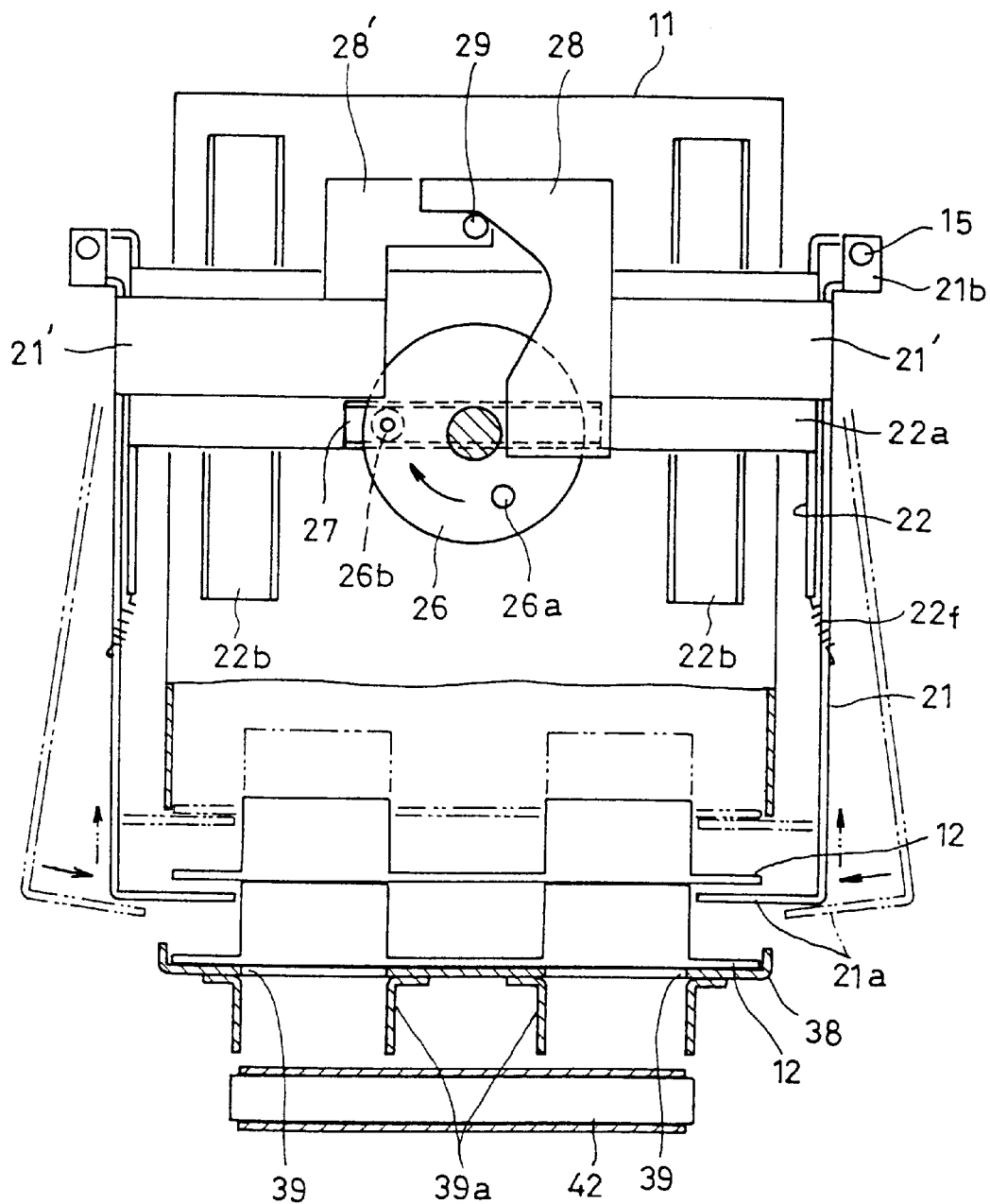
FIG. 9 is a third view illustrating the operation of the panel mover.

As the rotary disk 26 rotates further, the panel plates 21 and the coupling plates 22 are raised further to the level shown by two-dot chain lines in FIG. 9, that is, the original level shown in FIG. 5. During this operation, the panel holder plate 21 and coupling plate 22 on the left hand side, which are coupled to their counterparts on the right through the power transmission plate 28' and synchronizing pin 29, move exactly symmetrically with the members on the right.

While the panel holder plates 21 are rising from the level shown by solid lines in FIG. 9 to the level shown by two-dot chain lines, the push arms 23 abut the pins 22d and pivot so that their L-shaped ends are lowered. The panel 12 is thus pushed out horizontally by the coupling rod 23d to the position shown in FIG. 2, where the foremost cartridges T of the panel are over the opening 39 formed in the horizontal guide plate 38.

Figure 10A:
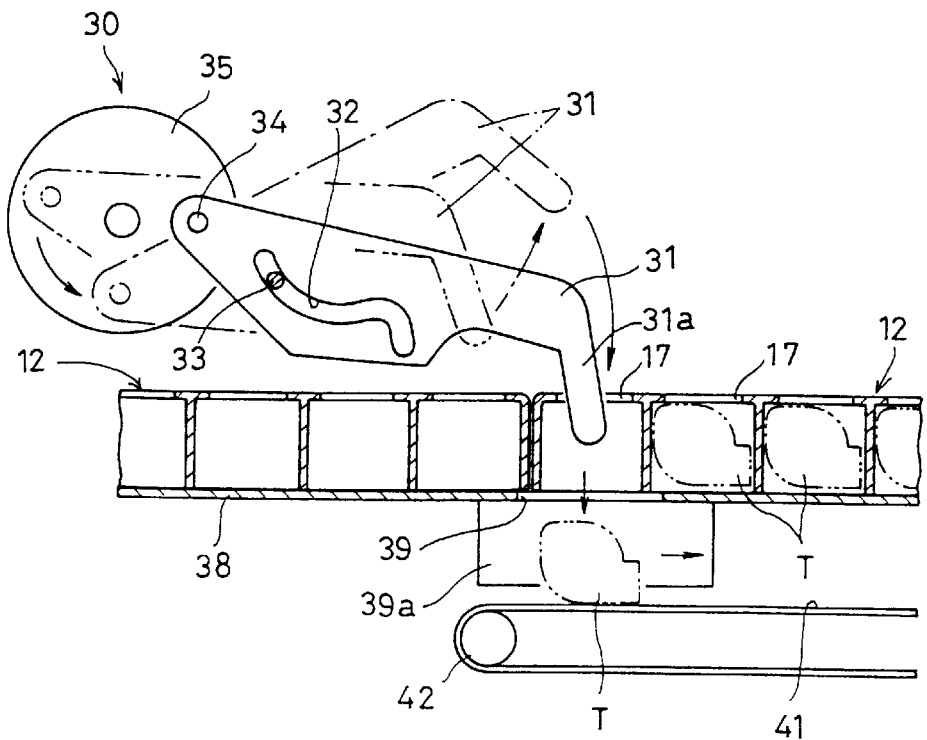
FIG. 10A is a first view illustrating the operation of a cartridge separator.

When or slightly before the panel 12 reaches the above position, the cartridge separator 30 is activated to move the separating arms 31 until their tips 31a moves to over the cartridges T to be separated from the panel, as shown in FIG. 10A. As shown, the separating arms 31 are raised from the position shown by two-dot chain lines to the position shown by one-dot chain lines. Then, the entire separator 30 is advanced rightwardly, while lowering the tips 31a. When the tips are inserted into the openings 17 of the panel 12, the cartridges T separate and drop.

Figure 10B:
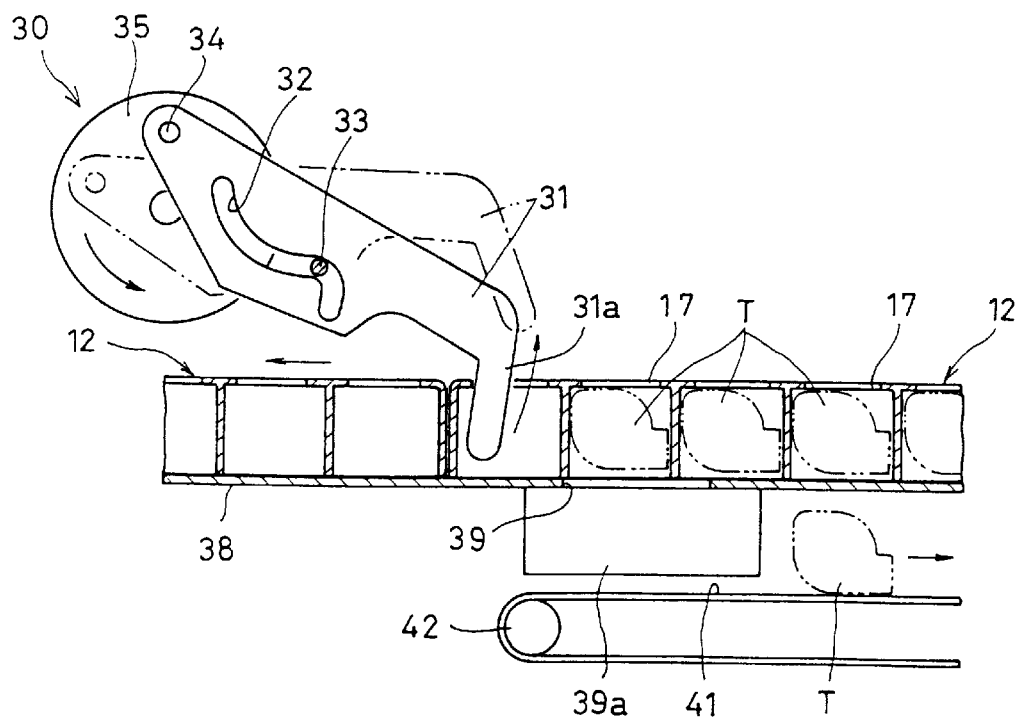
FIG. 10B is a second view illustrating the operation of a cartridge separator.

Now referring to Fig. 10B, when the cartridges T have been separated, the tips 31a are raised as shown by the arrow while being moved horizontally to pull the panel 12 by a distance equal to the length of one cartridge. The arms thus move back to the horizontal position shown by two-dot chain line. In this way, the arms 31 separate cartridges T and move panels 12 laterally.

By repeating the above operation, the cartridges in the respective rows of one panel are separated by the separating arms 31. When all the cartridges have been separated, another panel is deposited on the horizontal guide plate 38. The cartridges separated are sent to the photoprinter in a single file as described above.

Cartridge panels 12 are pushed by the subsequent panels into the panel storage unit 50 and stacked one on another. When each panel 12 is pushed onto the panel stacker 51, the panel stacker 51 is raised by the motor 55 and stopped when the panel 12 passes the panel holder 53.

Figure 11A:
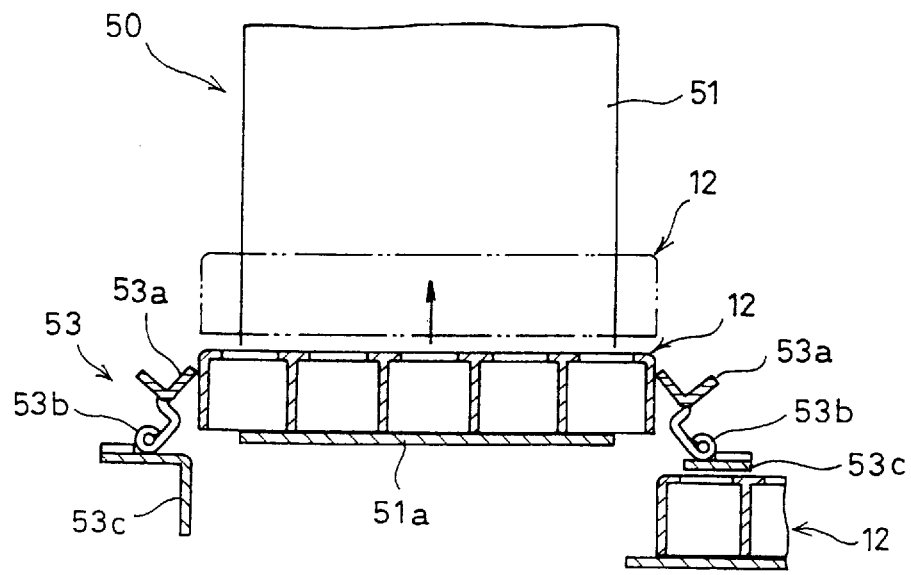
FIG. 11A is a first view showing.
Figure 11B:
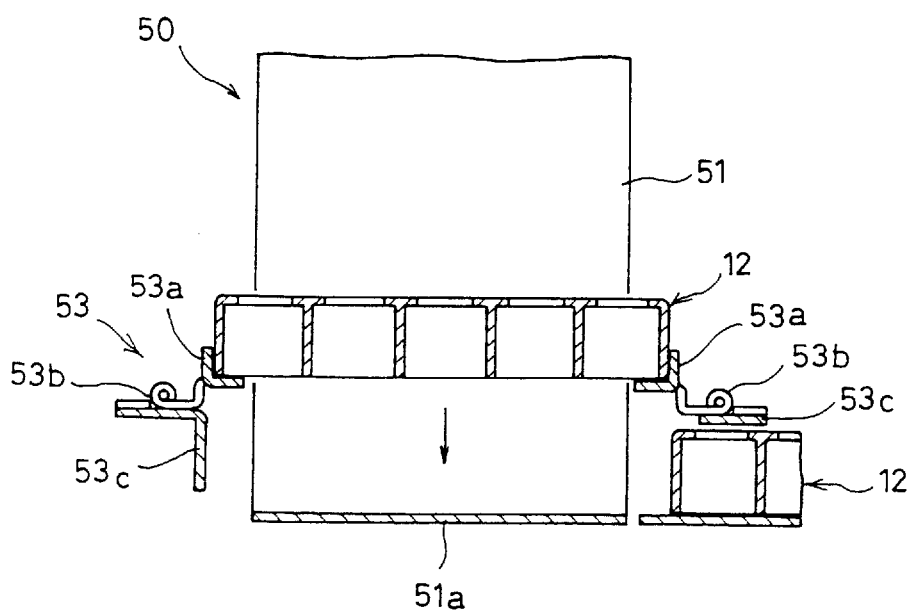
FIG. 11B is a second view showing the operation of a panel storage unit.

The cartridge panel 12 pushes and pivots the hinge members 53b of the panel holder 53 (FIG, 11A). When the panel 12 passes, the springs 53d push the panel holding members 53a back to the horizontal position. Then, the panel stacker 51 is lowered again to the same level as the horizontal guide plate 38 so that another panel is pushed onto the bottom plate 51a of the panel stacker 51 (FIG. 11B).

This operation is repeated to stack a plurality of panels 12 in the panel storage unit 50.

In the first embodiment, in order to separate cartridges at a predetermined position by inserting the tips of the separating arms, panels are moved little by little on the horizontal guide plate 38. But this embodiment is subject to various modifications.

Figure 13:
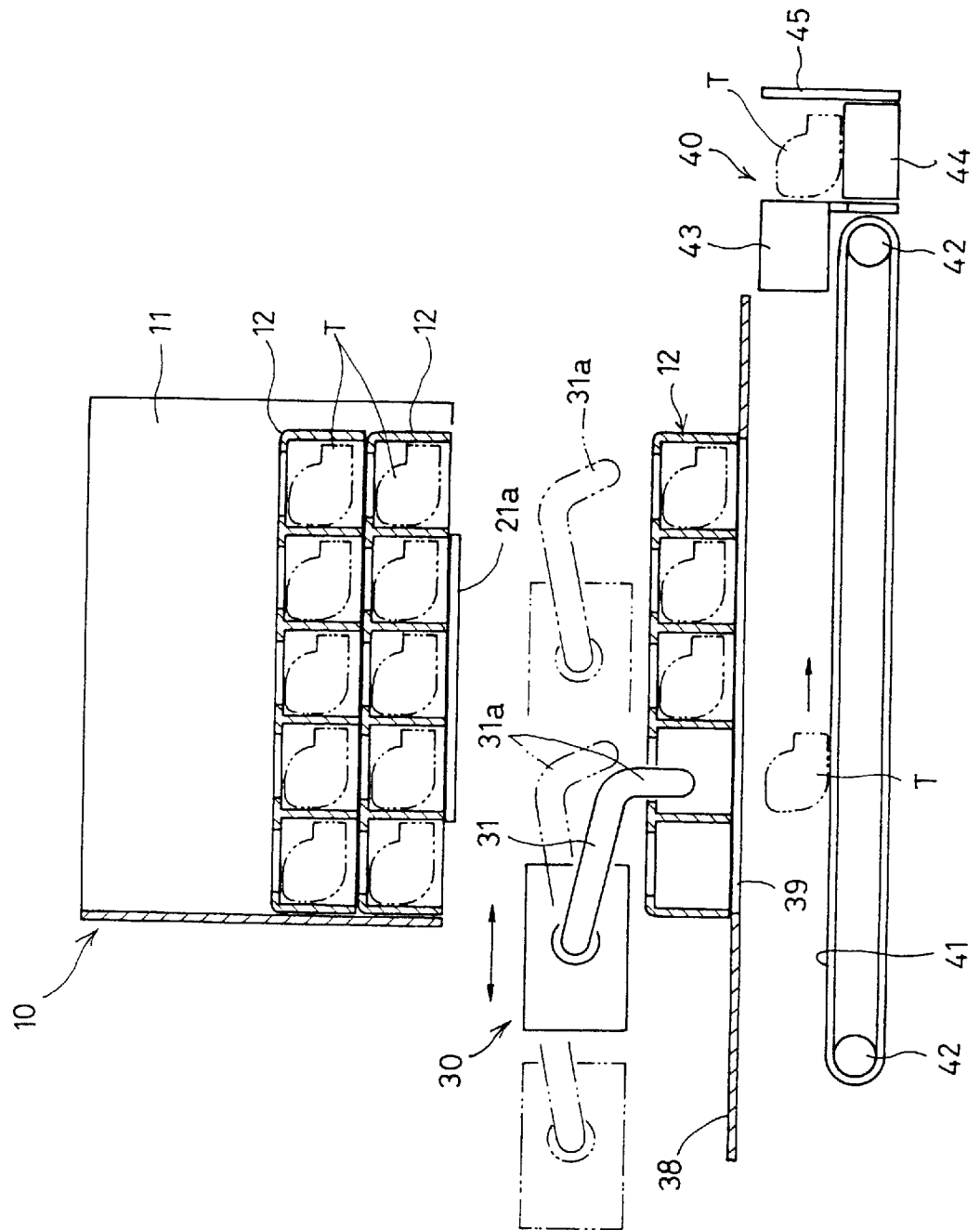
FIG. 13 is a partial schematic view of a feed apparatus for feeding film-loaded cartridges of another embodiment.

One such modification is shown in FIG. 13, in which each panel 12 is not moved when it is deposited right under the box 11. Separating arms 31 are inserted between this panel 12 and the panel immediately above.

In this alternate embodiment, the entire cartridge separator 30 moves horizontally while bending the separating arms 31 to push cartridges T down through an elongated opening 39 extending the entire length of the panel 12. When the rearmost cartridges T have been separated, the arms 31 are advanced horizontally without being raised to pull the empty panel 12 forward so that the next panel 12 can be placed on the plate 38.

But panels may be moved little by little by the separating arms 31 as in the first embodiment. In this case, openings 39 through which one cartridge T can pass are formed under the forefront cartridges of each panel 12.

As described above, in the film feed method of the present invention, cartridge panels carrying film-loaded cartridges are stored in a cartridge storage unit. The cartridge panels are sent by a conveyor means to a cartridge separating station to separate cartridges from the panels. With this arrangement, it is possible to feed cartridges continuously into the photoprinter in a highly efficient manner.

Cartridges loaded with developed films are set in panels. In the photoprinter, these panels are simply stacked one on another, so that the printing steps are simplified still further.

The apparatus of the present invention makes it possible to carry out either of the above methods with high reliablity. This apparatus is simple in structure and inexpensive too.

What is claimed is:

1. An apparatus for feeding film cartridges comprising:
   a cartridge storage unit having a plurality of cartridge panels and a panel moving device;
   a horizontal guide plate positioned beneath said cartridge storage unit;
   each of said cartridge panels having a plurality of cartridge pockets arranged on a panel plate; each of said cartridge pockets being capable of holding a film cartridge;
   said panel moving device including a cartridge panel holder;
   said cartridge panel holder being capable of vertical movement between a first upper position whereat said cartridge panel holder engages a panel plate of a lowermost cartridge panel such that said plurality of cartridge panels are stacked on said cartridge panel holder, a lower position whereat said cartridge panel holder disengages said panel plate of said lowermost cartridge panel whereby said plurality of cartridge panels are stacked on said horizontal guide plate, and a second upper position whereat said cartridge panel holder engages a panel plate of a cartridge panel positioned above said lowermost cartridge panel such that a plurality of cartridge panels are stacked on said cartridge panel holder and whereby said lowermost cartridge panel is positioned on said horizontal guide plate;
   a cartridge separator unit positioned along said horizontal guide plate, said cartridge separator unit having at least one cartridge separating device for separating a film cartridge from said cartridge pocket; and
   a first conveyor positioned below said horizontal guide plate such that said film cartridge separated from said cartridge pocket is deposited on said conveyor.

2. The apparatus of claim 1, further comprising a second conveyor extending from a delivery end of said first conveyor, said second conveyor extending in a different direction than said first conveyor.

3. The apparatus of claim 1, wherein said cartridge panel holder includes a first panel holder plate having a first flange on a lower end thereof, a second panel holder plate having a second flange on a lower end thereof, a panel holder plate support portion, an upper end of said first panel holder plate pivotally connected to said panel holder plate support portion, and an upper end of said second panel holder plate pivotally connected to said panel holder plate support portion.

4. The apparatus of claim 3, wherein an end of said first flange faces an end of said second flange in opposing relation when said cartridge panel holder is in said first upper position or said second upper position.

5. The apparatus of claim 1, further comprising a drive source connected to said cartridge panel holder such that said drive source moves said cartridge panel holder between said first upper position, said lower position, and said second upper position.

6. The apparatus of claim 5, wherein said drive source includes a motor having a drive shaft, said drive shaft having a rotary disk positioned on a free end thereof, said rotary disk having an outer side facing away from said motor, said outer side having a roller extending therefrom, said roller fitting into a holder groove on said cartridge panel holder such that said roller is capable of moving within said holder groove as said rotary disk rotates thereby moving said cartridge panel holder.

7. The apparatus of claim 1, further comprising a push arm having a push end, said push arm being pivotally connected to said cartridge storage unit such that said push arm pivots as said cartridge panel holder moves to said second upper position, whereby said push end of said push arm contacts said lowermost cartridge panel such that said push end moves said lowermost cartridge panel along said horizontal guide plate.

8. The apparatus of claim 7, wherein each of said at least one cartridge separating device includes a separating arm having a tip, said separating arm being capable of pivoting such that said tip is inserted into a cartridge pocket of a cartridge panel when said separating arm is pivoted, whereby said film cartridge is separated from said cartridge pocket.

9. The apparatus of claim 8, wherein said separating arm pivots about a pin, said pin fitting into an arm groove on said separating arm such that said pin is capable of moving within said arm groove, whereby said separating arm is capable of pivoting and moving horizontally.

10. The apparatus of claim 1, wherein each of said at least one cartridge separating device includes a separating arm having a tip, said separating arm being capable of pivoting such that said tip is inserted into a cartridge pocket of a cartridge panel when said separating arm is pivoted, whereby said film cartridge is separated from said cartridge pocket.

11. The apparatus of claim 10, wherein said separating arm pivots about a pin, said pin fitting into an arm groove on said separating arm such that said pin is capable of moving within said arm groove, whereby said separating arm is capable of pivoting and moving horizontally.

12. The apparatus of claim 1, wherein each of said at least one cartridge separating device is capable of moving along said horizontal guide plate.

13. An apparatus for feeding film cartridges comprising:
   a pair of opposed panel holder plates, each of said panel holder plates having an upper end and a lower end;
   said pair of opposed panel holder plates having respective flanges on said lower end;
   a plurality of cartridge panels, each of said cartridge panels having a plurality of cartridge pockets arranged on a panel plate, each of said cartridge pockets capable of holding a film cartridge;
   said plurality of cartridge panels arranged in a stack;
   a panel holder plate support portion pivotally connected to said upper end of each of said panel holder plates such that said panel holder support portion connects said pair of panel holder plates to each other;
   a horizontal guide plate positioned beneath said pair of opposed panel holder plates;
   said panel holder plate support portion being capable of vertical movement between a first upper position, whereat respective ends of said respective flanges face each other in opposing relation and said respective flanges support said stack of cartridge panels by engaging said panel plate of a lowermost cartridge panel, a lower position whereat said pair of panel holder plates have pivoted such that said respective flanges move apart and disengage said panel plate of said lowermost cartridge panel whereby said horizontal guide plate supports said stack of cartridge panels, and a second upper position whereat said pair of panel holder plates have pivoted such that said respective ends of said respective flanges face each other in opposing relation and said respective flanges support said stack of cartridge panels by engaging a panel plate of a cartridge panel positioned above said lowermost cartridge panel whereby said lowermost cartridge panel is positioned on said horizontal guide plate;

at least one separating arm having a tip, each of said at least one separating arms being capable of pivoting such that said tip is inserted into a cartridge pocket of a cartridge panel when said separating arm is pivoted, whereby said film cartridge is separated from said cartridge pocket; and a first conveyor positioned below said horizontal guide plate such that said film cartridge separated from said cartridge pocket is deposited on said conveyor.

14. The apparatus of claim 13, further comprising a second conveyor extending from a delivery end of said first conveyor, said second conveyor extending in a different direction than said first conveyor.

15. The apparatus of claim 13, further comprising a drive source connected to said panel holder plate support portion such that said drive source moves said panel holder plate support portion between said first upper position, said lower position, and said second upper position.

16. The apparatus of claim 15, wherein said drive source includes a motor having a drive shaft, said drive shaft having a rotary disk positioned on a free end thereof, said rotary disk having an outer side facing away from said motor, said outer side having a roller extending therefrom, said roller fitting into a holder groove on said panel holder plate support portion such that said roller is capable of moving within said holder groove as said rotary disk rotates thereby moving said panel holder support portion.

17. The apparatus of claim 13, further comprising a push arm having a push end, said push arm capable of pivoting, said push arm linked to said panel holder plates such that said push arm pivots as said panel holder plates move to said second upper position, whereby said push end of said push arm contacts said lowermost cartridge panel such that said push end moves said lowermost cartridge panel along said horizontal guide plate.

18. The apparatus of claim 17, wherein each of said at least one separating arm pivots about a pin, said pin fitting into an arm groove on each of said at least one separating arm such that said pin is capable of moving within said arm groove, whereby each of said at least one separating arm is capable of pivoting and moving horizontally.

19. The apparatus of claim 13, wherein each of said at least one separating arm pivots about a pin, said pin fitting into an arm groove on each of said at least one separating arm such that said pin is capable of moving within said arm groove, whereby said separating arm is capable of pivoting and moving horizontally.

20. The apparatus of claim 13, wherein said horizontal guide plate has at least one hole such that said film cartridge passes through said hole when separated from said cartridge pocket.

* * * * *